United States Patent [19]

Wilson

[11] 4,218,107
[45] Aug. 19, 1980

[54] BATTERY PACK CONNECTION
[75] Inventor: Anton F. Wilson, White Plaines, N.Y.
[73] Assignee: Anton/Bauer, Inc., Shelton, Conn.
[21] Appl. No.: 38,351
[22] Filed: May 11, 1979
[51] Int. Cl.³ .............................................. H01R 13/62
[52] U.S. Cl. .................................. 339/75 P; 339/91 F;
339/125 R
[58] Field of Search ............... 339/75 R, 75 M, 75 P,
339/76–79, 91 F, 119 R, 125 R

[56] References Cited
U.S. PATENT DOCUMENTS

| | | | |
|---|---|---|---|
| 3,335,330 | 8/1967 | Hall | 339/119 R |
| 3,564,482 | 2/1971 | Yamanaka et al. | 339/91 F |
| 3,740,696 | 6/1973 | Schlekher et al. | 339/75 M |

Primary Examiner—John McQuade
Attorney, Agent, or Firm—Thomas L. Tully

[57] ABSTRACT

A battery pack connection consists of a flat male plate having a plurality of spaced headed projections and female electrical terminals carried within a projecting housing while a flat female plate has a plurality of through keyholes for receiving the projections and male electrical terminals positioned within a recess together with a flexible strip that engages a projection to enable locking and unlocking of the plates in both their electrical and mechanical connected relationship.

9 Claims, 5 Drawing Figures

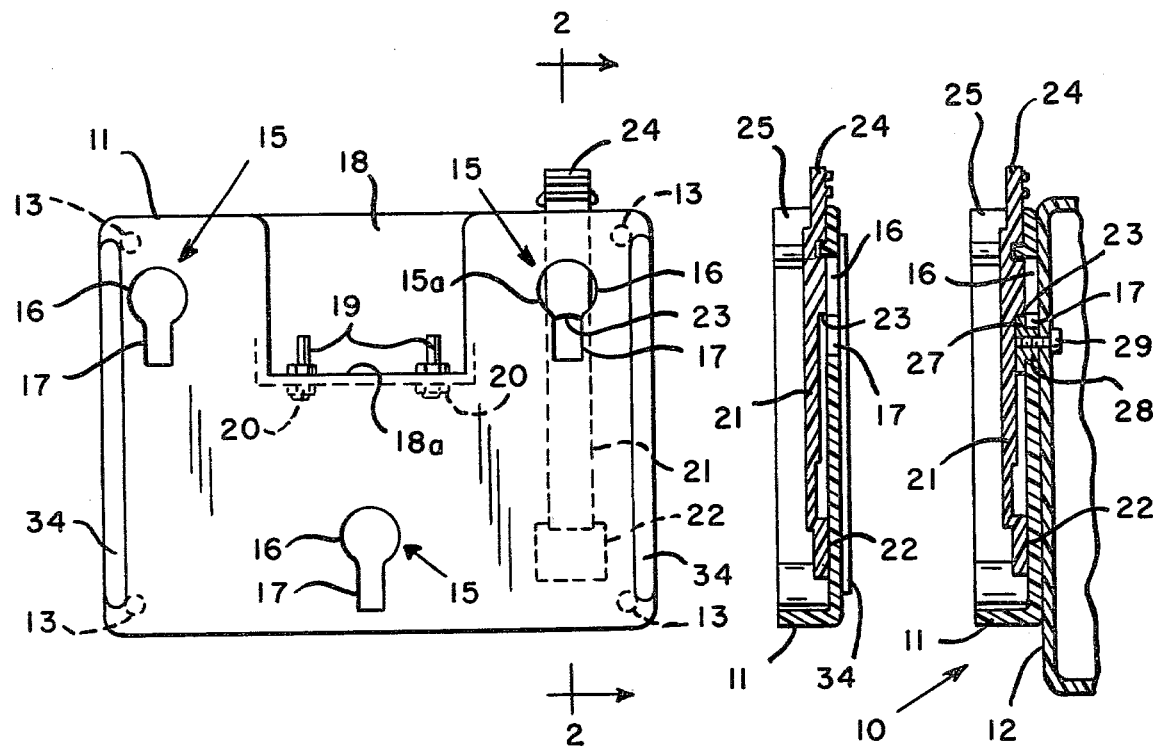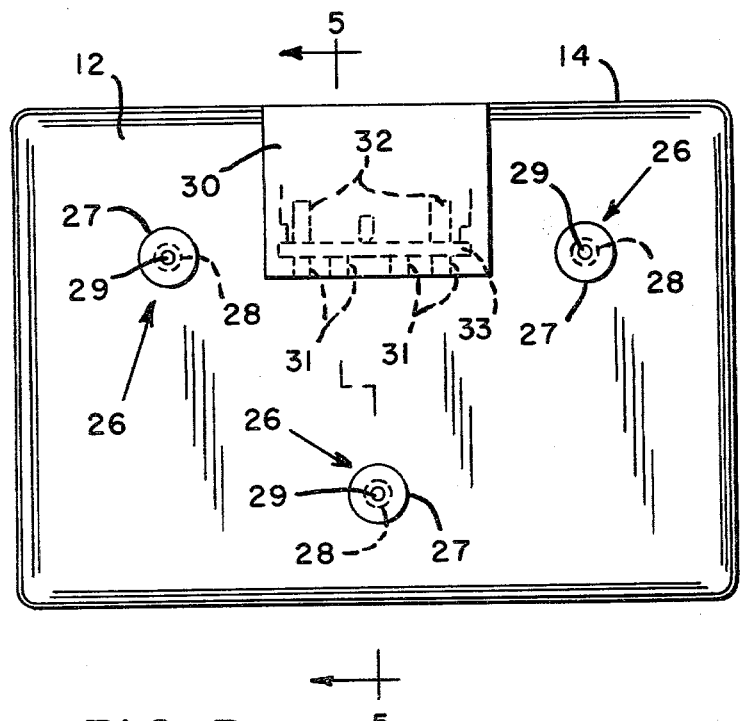

BATTERY PACK CONNECTION

The present invention has particular utility when used with electrical devices that are portable and which derive their power from batteries that are contained within a pack and which are generally connected by a cable to the device. Typically, the power supplied by the battery pack is utilized quite rapidly requiring frequent replacement of a discharged battery pack by a freshly charged pack. Heretofore, the replacement of a pack has generally required both an operation which effects disconnecting of the electrical connection between the pack and the device and also another operation which separates the pack from its supporting structure so that not only was replacement somewhat time-consuming and requiring the user's undivided attention, but also it was susceptible to improper securement and connection.

It is accordingly an object of the present invention to provide a battery pack connection which enables a battery pack to be quickly, effectively and easily removed and replaced by a user.

Another object of the present invention is to achieve the above object with a battery pack connection which enables removal and replacement of a battery pack with essentially only a one-hand, single movement operation which does not require direct observation by the user.

A further object of the present invention is to achieve the above objects with a battery pack connection which includes a female plate and a male plate which are capable of being interconnected in only one position and in which said position not only secures the plates together but also effects the proper electrical connection therebetween in addition to releasable locking the two plates in said connected position.

Still another object of the present invention is to provide a battery pack connection which is adaptable for use on a variety of sizes of battery packs, is relatively inexpensive to manufacture and which is reliable and durable in use.

In carrying out the present invention, the battery pack connection includes a female plate that is secured, as for example, directly to a portable device or may be carried by the user by being strapped to the user's body. The female plate is formed with a plurality of keyholes together with at least one male terminal with the keyholes and the terminal extending in the same direction but with the terminal being positioned within a recess spaced beneath the plane of the female plate. A male plate cooperates with the female plate and may form one side of a battery containing recepticle or pack. The male plate has a plurality of headed projections extending therefrom and at least one female terminal positioned within a housing that projects from the plane of the male plate.

In use, the female plate is fixed and connected to the electrical device and if the male plate is part of the battery pack, the user positions the male plate against the female plate with initial alignment occurring between the recess and the housing and with said alignment preventing lateral shifting of the plate with respect to the slots of the keyholes. The user can then only move the male plate in the direction of the keyhole slots until the headed projections enter into the circular openings of the keyholes. The male plate is then further moved to position the projections within the slots of the keyholes with said movement causing electrical connection between the male and female terminals.

When the male plate has achieved its connected position, a flexible strip that is positioned behind one keyhole reverts to its normally baised position wherein it has a ledge which engages the head of the projection in said keyhole and prevents the two plates from moving from their connected position.

For removing the plate, the user merely bends the flexible strip from its normal position which unlocks the engagement between the strip and the projection to thereby permit the male plate to be moved so as to position the headed projections within the circular openings of the keyholes. At this position, the terminals have been disconnected and the male plate can be removed from the female plate in order to permit a charged battery pack to be replaced on the female plate.

Other features and advantages will hereinafter appear.

In the drawing

FIG. 1 is an elevation of the face of the female plate.

FIG. 2 is a section on the line 2—2 of FIG. 1.

FIG. 3 is an elevation of the face of the male plate.

FIG. 4 is a section also taken on line 2—2 of FIG. 1 but with the plates being shown in their connected position.

FIG. 5 is a section taken on the line 5—5 of FIG. 3 with the two plates being shown in their connected position.

Referring to the drawing, the battery pack connection of the present invention is generally indicated by the reference numeral 10 and includes a female plate 11 and a male plate 12. The plate 11 has a plurality of threaded apertures 13 on its backside corners by which it may be secured to an electrical device or a support or a recharging unit (not shown) while the male plate 12 constitutes one side of a closed container 14, diagrammatically illustrated in dotted lines, which contains rechargable batteries. The container, if desired, may be secured to the male plate by fasteners extending into the peripheral edges of the plate. It will be understood that, if desired, the two plates may be reversely connected to the device and batteries.

The female plate 11 is formed with a plurality of through keyholes 15 with each having a circular opening 16 and a narrow depending slot 17. Formed between the two upper keyholes is an open top recess 18 in which two male terminals 19 are secured though if desired, a different number may be employed. The terminals 19, as shown, are positioned at the bottom 18a of the recess and secured thereto as by passing through holes formed therein with nuts 20 threaded onto the bottom of the terminals to secure them in place. The remaining exposed threaded portions enable wires to be secured thereto on the opposite side of the female plate to effect electrical connection to the terminals. By positioning the terminals within the recess, they accordingly are located beneath the face of the front of the female plate and hence less subject to abuse during the substitution of one battery pack for another or when exposed.

One end of a relatively rigid strip 21 is secured on the backside of the female plate as at 22 by an adhesive and it is normally biased towards the backside. The strip overlies a keyhole 15a and is formed with a somewhat circular ledge 23 that essentially closes the circular opening of the keyhole 15a, while the free end 24 of the strip extends somewhat above the female plate. A user is capable of bending the strip away from the backside of the female plate by using the exposed end. As shown, the female plate has a cut-out 25 through which the free end projects.

The male plate 12 is formed with a plurality of projections 26, each of which has a large head 27 and an integral narrow leg portion 28. Each projection may be secured to the male plate by being formed with an axial threaded hole into which a screw 29 from the backside of the male plate is threadable.

Extending beyond the face of the male plate is an integral housing 30 having the generally rectangular shape shown. The housing is formed with a plurality of holes 31 extending upwardly for enabling mating access of the male terminals to female terminals 32. The terminals 32 are clinched onto a flat insulating plate 33 supported in a slot formed on the rear surface.

In use, assuming the male plate is part of the battery pack container and the female plate is secured to the electrical device or to a supporting structure carried by the user, the user positions the male plate against the female plate and shifts the male plate until the heads 27 of the projections extend into and beyond the circular openings 16 of the keyholes. This causes the strip 21 to be bent backwards from its normal position by the head of the projection contacting the ledge 23. Moreover, this positions the female terminals 32 of the male plate in alignment with the male terminals 19 of the female plate. The user then merely relatively moves the two plates to cause the projections to extend into the slots 17 of the keyholes which also causes the male terminals to enter into the female terminals. When the projections extend essentially completely into the keyholes, the strip is no longer flexed by the head of its associated projection engaging the ledge 23 and accordingly, it reverts to its normal biased condition wherein the ledge, by being above, overlies the head of the projection to lock the two plates together in their connected position. Generally, the bias of the strip is sufficiently great that an audible click is made by the strip when it is permitted to assume its normal position by the plates assuming their locked position.

It should be noted that the housing 30 has a thickness that is somewhat greater than the height of the projections which facilitates the initial placing of the male plate on a female plate by the side walls of the housing engaging the side walls of the recess so that only relative up and down movement is required to align the heads of the projections with the circular openings of the keyholes.

To remove the battery pack, the user merely bends the strip by pushing on the free end 24 thereof which obviates the locking of the strip and permits the male plate to be slid upwardly on the female plate until the heads of the projections become aligned with the circular openings 16. This also frees the male terminals from the female terminals so that the male plate may then be separated from the female plate by a movement perpendicular to the faces of the plates.

Preferably, each plate is molded integrally of plastic with the strip also being plastic while the headed projection and terminals are formed of metal.

While it is contemplated that the male and female terminals may be interchanged with their respective plates, the heretofore described embodiment has been found preferable.

To decrease the friction between the plates when the projections are being moved in the slots, and to minimize looseness between the plates when they are in their connected position, it has been found desirable to provide slightly raised elongate pads 34 extending along the sides of the female plate for engaging the surface of the male plate.

It will accordingly be understood that there has been disclosed a battery pack connection that consists of a female plate and a separable male plate. The female plate includes a plurality of keyholes and male electrical terminals provided in a recess while the male plate has a plurality of headed projections, one for each keyhole, and a plurality of female terminals carried in a housing protruding out from the face of the male plate. With this construction, a user may, without actual observation and using one motion with one hand, cause the plates to be initially aligned by the housing fitting within the recess, then only shift the plates in one direction so that the projections are aligned with their associated keyholes and finally, relatively move the plates until the projections are within the slots of the keyholes at their connected position. The movement that mechanically connects the plates also simultaneously in the same operation, effects the electrical connection between the plates. The assuming of the connected position generally generates a perceptable noise indicating the locking of the plates in their connected position and/or by being unable to relatively shift the male plate, the user becomes assured that the plates are locked together and the electrical connection has been made. For removal, neither direct observation nor more than one hand or one operation is required, as the user merely bends the strip to effect unlocking and then relatively moves the plates to a position where they can be separated with such a movement also simultaneously effecting the electrical disconnection. In both the securing and removal actions, neither direct observation of the user nor more than one operation is necessary.

Variations and modifications may be made within the scope of the claims and portions of the improvements may be used without others.

What is claimed is:

1. A releasable battery pack connection comprising a relatively flat male plate and a relatively flat female plate, said plates being adapted to be releasably locked together in connected position; said female plate including a plurality of through keyholes with each having a circular opening and a depending slot, and at least one elongate terminal, said terminal and keyhole slots being elongate in the same direction; said male plate including a plurality of spaced headed projections with there being one for each keyhole and with each projection having head and leg portions, and at least one elongated mating terminal; said male plate being positioned abutting the female plate with the legs of the projections being located in the slots of the associated keyholes and with the one terminal within the mating terminal, and releasable locking means on one of said plates for engaging means on the other of said plates to lock said plates in connected position by preventing relative movement between said plates in the direction of said keyhole slots until said locking means is released.

2. The invention as defined in claim 1 in which the releasable locking means includes a flexible strip positioned on the backside of the female plate and means normally urging the strip against the backside of the female plate.

3. The invention as defined in claim 2 in which the strip includes a ledge positioned opposite the circular opening of one of the keyholes, said ledge being shaped to be engaged by the head of the projection when located in the circular opening and to overly the projection when the leg of the projection is positioned within the depending slot in the connected position of the plates.

4. The invention as defined in claim 3 in which the strip includes an end portion extending above the female plate for enabling manual flexing of the strip to bend the ledge away from overlying the projection to free the male plate for relative disconnecting movement of the plates.

5. The invention as defined in claim 1 in which the male plate is formed with a projecting housing and the female plate is formed with a recess, said housing and recess being of essentially similar shape to enable nesting of the housing in the recess when the plates are in their connected position.

6. The invention as defined in claim 5 in which the housing projects further outwardly from the male plate than the projections and in which the housing and recess have cooperating side walls extending in the same direction as the keyhole slots with said walls being engagable to facilitate aligning the projections with the circular openings.

7. The invention as defined in claim 5 in which the elongate terminal is a male terminal and is located in the recess and the mating terminal is a female terminal that is located in the housing.

8. The invention as defined in claim 7 in which the recess has a bottom extending transversely to the direction of the side walls of the recess and in which the at least one male terminal is secured on the bottom to extend in the same direction as the direction of the side walls of the recess.

9. The invention as defined in claim 7 in which the housing has a bottom extending transversely of the direction of the side walls of the housing and in which the at least one female terminal is positioned within the housing to extend in the same direction as the direction of the side walls of the housing with an opening located in the housing bottom.

* * * * *